April 28, 1942.  C. Q. PAYNE  2,281,170
METHOD OF AND APPARATUS FOR MELTING METALS BY ELECTROMAGNETIC INDUCTION
Filed Nov. 7, 1940
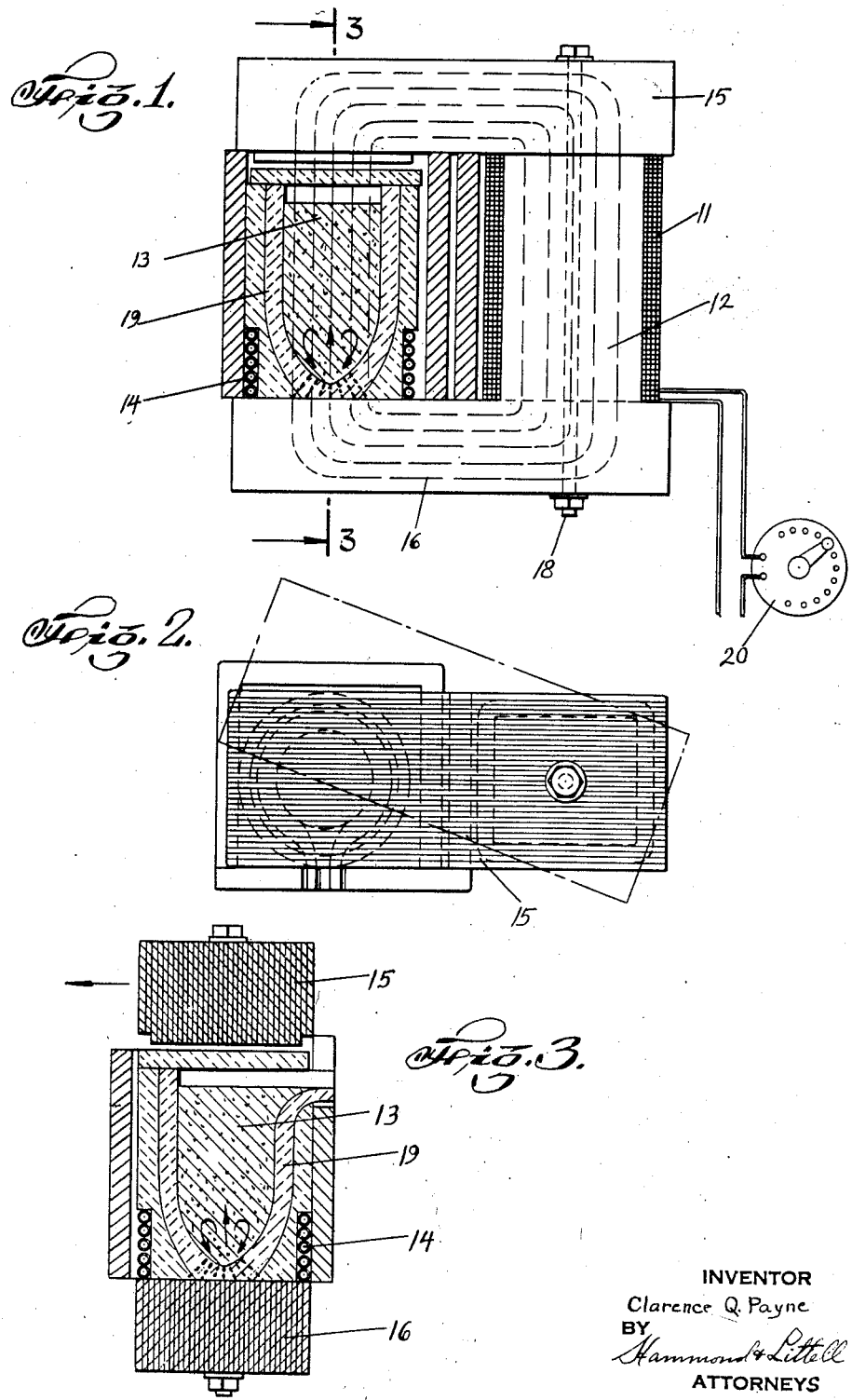
INVENTOR
Clarence Q. Payne
BY
Hammond & Littell
ATTORNEYS Patented Apr. 28, 1942

2,281,170

UNITED STATES PATENT OFFICE 2,281,170

METHOD OF AND APPARATUS FOR MELTING METALS BY ELECTROMAGNETIC INDUCTION

Clarence Q. Payne, New York, N. Y.

Application November 7, 1940, Serial No. 364,635

6 Claims. (Cl. 13—26)

This invention relates to a method of and apparatus for melting those metals which are either electrically conductive or magnetically permeable. It is especially adapted to melting iron which has been reduced at a low temperature from its enriched ores to pure sponge iron. The method is particularly effective when applied to metal in a fine state of division. In this method there is created within the charge of the sponge iron or other metal to be melted, an intense concentration of the flux density induced in the magnetic field of an alternating current electromagnet. The temperature of the sponge iron or other metal is then raised to its melting point by so shaping one end of the charge that an intense constriction of the lines of force is created there which increases electrical induction and magnetic reluctance.

The invention in its preferred embodiment also makes provision for safeguarding against overheating that portion of the iron path of the flux circuit of the electromagnet which is outside the sponge iron charge. This may include the use of iron having a very high magnetic permeability, such as laminated transformer iron, and giving the laminated iron core a much larger cross-sectional area than that of the sponge iron for the magnetic flux path of the lines of force. It also may provide heat insulation for the field coils in order to protect them from the radiant heat of the sponge iron when melted.

From the above it will be seen that this invention provides a new use of the flux circuit of an electromagnet whereby it is made more effective for metallurgical use. The electrical energy or electromotive force (in watts) required to charge the field coil is here converted into heat units, and these are then transferred directly into the sponge iron charge without the use of solid fuel or gases of any kind.

The nature and objects of the invention will be better understood from a description of an illustrative embodiment for the purposes of which description reference should be had to the accompanying drawing forming a part hereof and in which:

Figure 1 is a vertical cross-section of the electromagnet and illustrates the position of the crucible charge of sponge iron or other metal which forms part of the magnetic flux circuit of the electromagnet.

Fig. 2 is a plan view of the electromagnet.

Fig. 3 is a vertical cross-section taken through the sponge iron charge on the line 3—3 of Fig. 1.

In the induction furnace as usually designed, such as the Kjellin, the Colby, etc., described in A. Stansfield's book entitled, "The Electric Furnace for Iron and Steel," pages 371 and 377, the distinctive feature is that the primary coil has an iron core and is given a closed magnetic iron circuit while the secondary coil which comprises a single turn of iron and which forms the melting charge, surrounds the primary coil and is concentric with it. This type of induction furnace has the disadvantage of a low power factor which is caused by the great distance between the primary and secondary circuits. This permits a large magnetic leakage.

In my induction furnace, on the other hand, the primary coil 11 has an iron core 12 which does not have a closed magnetic iron circuit, but is divided into two parts by means of air gaps. This permits the charge of sponge iron 13 to be inserted into and form part of the magnetic flux circuit generated by the primary field coil. The secondary field coil 14 which is made up of several turns of water cooled copper tubing is placed around and is concentric only with the sponge iron charge. This makes a more compact and efficient arrangement of the coils and the induced magnetic flux of the secondary thus reinforces the flux of the primary coil. The temperature rise of the sponge iron due to the secondary coil is practically limited to the sponge iron since it is cut off from contact with the remaining portion of the iron core by the gaps both above and below the sponge iron charge. Moreover the temperature of the core and yokes of the electromagnet is further kept low by making them of laminated transformer iron which has a higher magnetic permeability than sponge iron, as well as by giving them a cross sectional area much greater than that of the sponge iron charge. This greatly reduces the flux density per square inch of the former as compared with the latter and therefore avoids overheating.

Still more important means for localizing the high melting temperature within the primary magnetic flux circuit of the electromagnet consists in giving the lower end of the sponge iron charge a coned end as shown in Fig. 1 and Fig. 3. This causes a great local condensation of the lines of force due to the constriction of their iron path at the end of the cone. This is also known as the "pinch effect." It causes a very rapid temperature rise within the sponge iron charge up to its melting point. The whole charge is gradually melted by reason of the motion of the molten metal due to thermal convection and motor effect.

This description will be clear from the drawing in which Fig. 1 shows the electromagnet with its magnet core 12 and its top and bottom yokes 15, 16. These are made of laminated transformer iron in order to secure the greatest magnetic permeability and least magnetic reluctance when the field is charged by the primary coil, which is wound with insulated copper wire. The laminations which make up the core 12 and lower yoke 16 are preferably made in single pieces in order to avoid any gaps at their joints. The upper yoke 15 is held to the core 12 by means of a through bolt 18. This enables this yoke to be swung to one side when the crucible 19 is being filled with sponge iron, or when molten iron is being discharged from it. The crucible 19 which holds the charge may be made of carborundum or of graphite mixed with fire clay. The bottom of the crucible on the inside is carefully shaped in order to secure the correct cone shape for the constriction, or "pinch effect," which starts the melting of the charge. Here also the mechanical currents of the melted charge take place as indicated by the arrows. These agitate the molten metal and distribute the heat throughout the charge. The secondary field coil 14 encircles the lower part of the crucible 16 and acts upon the sponge iron as a transformer.

This invention forms the second step in the production of pure iron by melting sponge iron derived from highly enriched iron ores. The first step consists in reducing to sponge iron those iron ores which can be so highly enriched that practically all their gangue minerals are removed. This is a low temperature reduction and involves raising the ore and its reducing gases to a temperature of only about 900° C. and as explained in my accompanying application Serial No. 364,634, filed concurrently herewith, this method of producing iron by a two stage, or two step treatment has the advantage of securing both a greater economy and a purer metal than is possible by the usual method of converting relatively low grade ores into pig iron in the blast furnace and then refining them by means of the Bessemer converter or the open hearth furnace. This will be clear from the fact that the intermediate product of sponge iron produced at 900° C. can be molded by pressure and utilized in quantity production for many complicated parts and thus save much expense for machine work. Furthermore when pure iron is thus melted from pure sponge iron by induction it is then free from those impurities such as metalloids and gases, which are always absorbed from high temperature fuels and slags.

This two stage reduction from its ores to melted iron, simplifies the whole metallurgy of iron and should secure a purer metal at a lower cost than has heretofore been obtainable.

It is possible to melt other metals besides iron in this type of induction furnace such as copper, zinc and lead, etc., especially as these metals have a lower melting temperature than iron. Although the presence of a non-ferrous metal in the crucible will in effect reduce the total length of the iron path of the flux circuit of the electromagnet by the proportionate length of the charge in the crucible, which may amount to 20% to 25% of the whole, and thus weaken the magnetic flux density passing through the charge, yet this difference may be partly compensated for by increasing the magneto-motive force of the electromagnet itself by means of the rheostat 20 in series with the primary coil. Furthermore, non-ferrous metals melt at a lower temperature than iron. They do not therefore require the intense concentration of the magnetic field to secure the high melting temperature needed for iron.

The foregoing particular description is illustrative merely and it is to be understood that modifications and variations may be made without departing from the spirit of the invention as defined in the appended claims.

I claim:

1. The method of melting finely divided inductive metals, which consists in constricting to a coned point the sectional area of such a metal charge, placing it within the magnetic flux circuit of an alternating electromagnet, and then raising to its melting temperature the coned portion of said charge by locally transforming the electric current from a low to a high amperage.

2. The method of melting pure iron which consists in placing a charge of pure sponge iron within the magnetic flux circuit of an alternating electromagnet, constricting jointly to a coned point both the flux density of the electromagnet and the sectional area of said charge and then raising the coned portion of said charge to its melting point, by locally transforming the electric current there from a low to a high amperage.

3. An induction furnace comprising an alternating current electromagnet having an exciting coil and an iron circuit having a gap, a crucible to contain a charge of sponge iron having a coned point at its lower end and so positioned in said gap as to be traversed by the magnetic lines of force excited in said core, in combination with a secondary coil surrounding the coned end of said iron charge and adapted to raise its temperature to the melting point by transforming the electric current in said secondary coil to a high amperage.

4. Apparatus for melting pure sponge iron which comprises an alternating current electromagnet having a primary and a secondary field coil placed in series upon its magnetic circuit in combination with a crucible having a coned end to receive a correspondingly shaped charge of sponge iron forming part of the magnetic flux circuit of said electromagnet, said second coil being arranged to surround the crucible charge of sponge iron at the coned end, the arrangement producing a "pinch effect" by magnetic constriction at the coned end of said sponge iron charge, and raising its temperature to the melting point.

5. An induction furnace comprising an electromagnet having an iron core, and a gap in the magnetic flux circuit, an exciting coil surrounding said core, and a crucible positioned in said gap in position to be traversed by the lines of magnetic force excited in said core by current in said coil, said crucible having a conical lower end whereby, in operation, the lines of magnetic force are concentrated to provide intense heat in said conical lower end.

6. An induction furnace comprising an electromagnet having an iron core, and a gap in the magnetic flux circuit, an exciting coil surrounding said core, and a crucible positioned in said gap in position to be traversed by the lines of magnetic force excited in said core by current in said coil, said crucible having a conical lower end, a secondary coil surrounding the crucible at its conical lower end whereby, in operation, the lines of magnetic force are concentrated to provide intense heat in said conical lower end.

CLARENCE Q. PAYNE.